Figure 1:
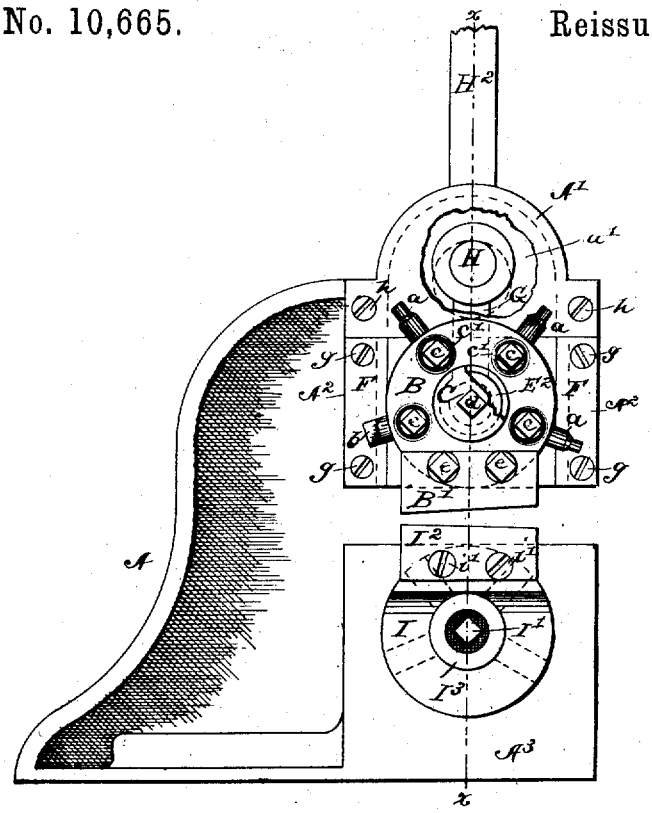

2 Sheets—Sheet 1.

A. S. TOWLE.

Assignor, by direct and mesne assignments, to the ROCHESTER MACHINE COMPANY.

COMPOUND METAL WORKING MACHINE.

No. 10,665. Reissued Nov. 24, 1885.

WITNESSES

John C Miller

Percy White

INVENTOR

Abner S. Towle.

per H. W. Cragin Attorney

A. S. TOWLE.

Assignor, by direct and mesne assignments, to the ROCHESTER MACHINE COMPANY.

COMPOUND METAL WORKING MACHINE.

No. 10,665. Reissued Nov. 24, 1885.

WITNESSES

John C Miller,

Percy White.

INVENTOR

Abner S. Towle.

per E. M. Cragin Attorney

UNITED STATES PATENT OFFICE.

ABNER S. TOWLE, OF ROCHESTER, NEW HAMPSHIRE, ASSIGNOR, BY DIRECT AND MESNE ASSIGNMENTS, TO THE ROCHESTER MACHINE COMPANY, OF SAME PLACE.

COMPOUND METAL-WORKING MACHINE.

SPECIFICATION forming part of Reissued Letters Patent No. 10,665, dated November 24, 1885.

Original No. 321,547, dated July 7, 1885. Application for reissue filed October 10, 1885. Serial No. 180,618.

*To all whom it may concern:*

Be it known that I, ABNER S. TOWLE, a citizen of the United States, residing at Rochester, in the county of Strafford and State of New Hampshire, have invented certain new and useful Improvements in a Compound Metal-Working Machine; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

The object of this improvement is a metal-working machine, of economical construction and simple operation, adapted to shearing metal, cutting saw-teeth, and punching holes of different sizes, thereby obviating the use and expense of several distinct machines. These results are attained by the means illustrated in the drawings filed as part hereof, in which the same letters of reference denote the same parts in the different views.

Figure 2:
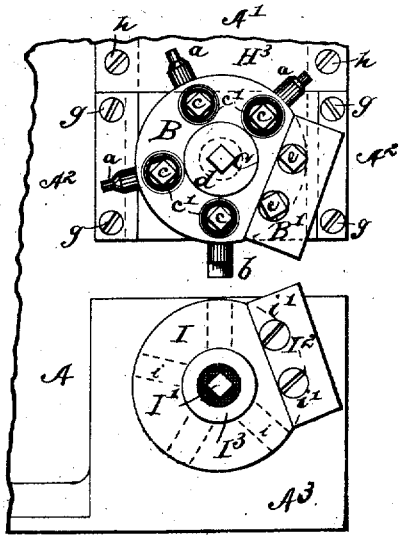
Figure 3:
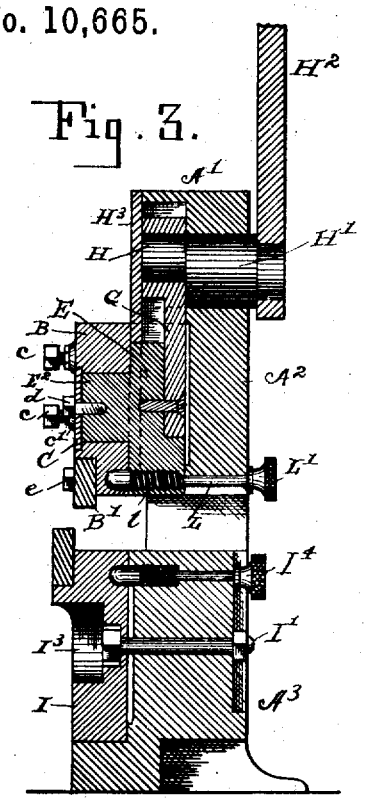
Figure 4:
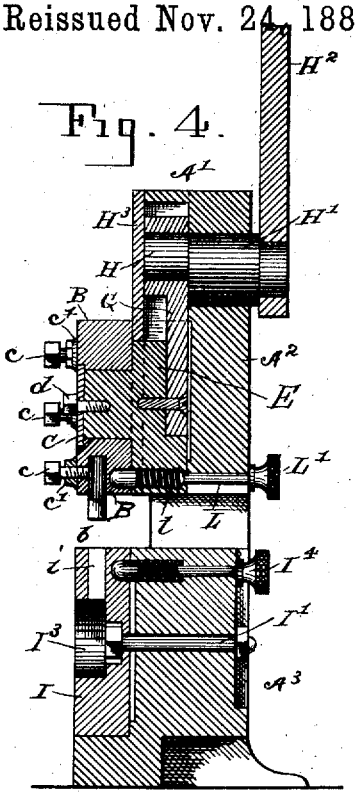
Figure 5:
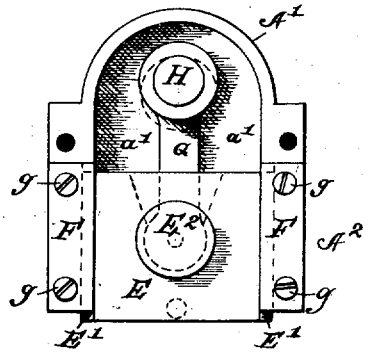
Figure 6:
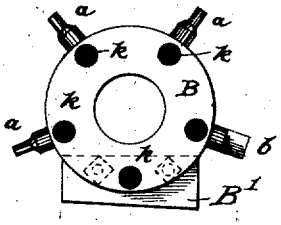
Figure 7:
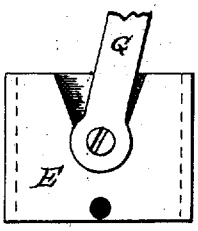

Figure 1 is a side elevation of a metal-working machine embodying the features of my improvement. Fig. 2 is a side elevation, partly in section, showing parts adjusted in position for cutting saw-teeth. Fig. 3 is a transverse vertical section taken on the line *x x* of Fig. 1. Fig. 4 is a similar section with the parts in the position shown in Fig. 2. Fig. 5 is a detail view showing the operation of the block, &c. Fig. 6 is a rear elevation of the cutter, &c., head detached. Fig. 7 is a similar view of the block and link, partly in section.

A A′ $A^2$ $A^3$ is the supporting-frame, made substantially in the form shown, the portion $A^2$ thereof supporting the cutting (and punching) mechanism, and the portion $A^3$ supporting the die.

The part A′ $A^2$ of the supporting-frame is recessed, as fully shown at *a′* in Fig. 5, for the reception of a sliding block, E, and a pitman or link, G, the lower end of which is movably fitted in a corresponding recess in the rear of the block E, as shown in Fig. 7, and connects the said block with a wrist, H, made integral with or suitably secured to a spindle, H′, having its bearing in the frame portion A′, beyond the rear side of which it projects, and where it is provided with a lever, $H^2$, by means of which partial rotation is given to the spindle H′ and downward or upward motion imparted to the block E through the link or pitman G, according to the direction of the motion of the lever $H^2$. The sliding block E is provided with beveled lateral projections E′, (shown in Fig. 5,) which fit and bear against correspondingly-beveled plates F F, secured to the frame part $A^2$ by screws *g*, and operate as guides for the block E, which is provided with an integral circular projection, $E^2$, for the reception of a circular head, B, having radial sockets for the reception of the punches *a* of different sizes, and a cutter, *b*, for cutting out saw-teeth, said cutter and punches being securely held in place by means of set-screws *c*, provided with lock-nuts *c′* for preventing unintentional change of their adjustment.

$H^3$ is a plate screwed to the upper part, A′, of the supporting-frames by screws *h* for the purpose of inclosing the chamber *a′* and giving a finished appearance to the mechanism.

B″ is a cutter set into a corresponding recess in the circular head, B, to which it is affixed by screws *e e*, as more fully shown in Fig. 3. The outer side of the head B is rabbeted for the reception of a circular plate, C, which is affixed to the projection $E^2$ of the block E by a screw, *d*, and thus secures the head B on the projection of the block E. The head B is provided on its rear side with perforations or sockets *k*, corresponding in number and position with the cutters and punches *a b* B′ for the reception of the end of a registering-pin, L, arranged to slide in a perforation in the sliding block E, where the pin is provided with a shoulder and a spiral actuating-spring, *l*, which causes the end of the registering-pin to automatically enter the perforations *k* when rotated for the purpose of changing the adjustment of the head B. (See Figs. 3 and 6.) The pin L is provided with a head, L′, which is detachable from the body of the pin, in order that the latter may be inserted in the perforations of the block E from its front side and be actuated thereafter by the spring *l*, as set forth. The object of the head L′ is the convenient operation of the pin when necessary to change the adjustment of the head B.

I is a circular die set into a corresponding recess in the part $A^3$ of the supporting-frame, to which it is secured by a bolt, I′, which passes through the frame and the die, as shown. This die is provided with suitable radial openings, as shown at *i* in Fig. 4, for the reception of punches *a* and cutter *b*. It is also provided with a recess at its outside for the reception of a cutter, $I^2$, affixed thereto by screws or bolts *i′ i′*.

$I^3$ is a central recess in the die I, through which the punchings and cuttings of the tools pass out of the die, which is also provided at its rear side with perforations corresponding with the positions of the openings for the reception of the punches and cutters. (See Figs. 2 and 4.)

$I^4$ is a registering-pin set in the frame portion $A^3$ and arranged to operate in the same manner as the pin L, and thereby secure the position of the die by entering the perforations mentioned.

By loosening the screw *d* and plate C, which secures the circular head B to the projection $E^2$ of the sliding block, and by withdrawing the registering-pin L from the head B, the latter may be rotated more or less, as occasion may require, for using the cutters or punches, and as the head B is moved around the pin L will automatically enter the perforation in the rear side that corresponds in position with the punch or cutter to be used, and thus secures the adjustment, after which the head B should be rigidly secured to the projection $E^2$ of the sliding block by tightening the screw *d*, (and plate C.) By loosening the bolt I′ and withdrawing the registering-pin $I^4$ from the die I, the latter may be adjusted to correspond with the part on the head B that is to be used, and the pin $I^4$, as the die is moved around, will enter the perforation in its rear side that corresponds with the position of the radial opening in the die that is adapted to receive the tool to be used, and thus automatically secure the adjustment, after which the die should be rigidly secured in position by tightening the bolt I′.

By operating the lever $H^2$ the sliding block E and head B will be moved toward the die I through the pitman or link G until their parts engage, and the machine thus made to punch holes of different sizes, cut saw-teeth, or shear metal, according to the adjustment of the parts.

Suitable gages may be attached to the machine, but as they form no part of the invention they are not shown in the drawings.

Having explained the construction and operation of my improvement, what I claim, and desire to secure by Letters Patent, is—

1. In a compound metal-working machine, the sliding block connected by means of a pitman or link with a spindle provided with a lever and arranged to operate a cutter, &c., head, substantially as shown and set forth.

2. The adjustable die arranged to operate in connection with the cutters and punches of the tool-carrying head, substantially as and for the purpose set forth.

3. The combination, with the sliding block, operated substantially as described, of a head provided with cutting and punching tools and capable of rotary adjustment on said block, and a subjacent die capable of like adjustment radially and centrally chambered and provided with a cutter, as set forth.

4. The combination, with the spindle and means for operating it, of the wrist, the link, the sliding block, the head attached to a projection on said block and provided with cutting and punching devices, the spring-actuated lock-pin engaging with sockets in the head, and the subjacent radially and centrally chambered die provided with an axial bolt, sockets, and a spring-actuated lock-pin, as set forth.

In testimony whereof I affix my signature in presence of two witnesses.

ABNER S. TOWLE.

Witnesses:
SIMON WOLF,
JOHN S. DANIELS.